United States Patent
Mamiya et al.

(10) Patent No.: US 6,325,041 B1
(45) Date of Patent: Dec. 4, 2001

(54) CONTROL APPARATUS FOR SPARK IGNITION TYPE DIRECT INJECTION ENGINE

(75) Inventors: Kiyotaka Mamiya; Michihiro Imada; Takeo Yamauchi; Masayuki Tetsuno, all of Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/497,192

(22) Filed: Feb. 3, 2000

(30) Foreign Application Priority Data

Mar. 30, 1999 (JP) .................................................. 11-087585

(51) Int. Cl.[7] ....................................................... F02B 3/00
(52) U.S. Cl. ........................................... 123/299; 123/305
(58) Field of Search .................................. 123/299, 295, 123/305, 430, 431; 60/285, 295, 299

(56) References Cited

U.S. PATENT DOCUMENTS 6,055,956 * 5/2000 Nishimura et al. ................... 123/299
6,085,718 * 7/2000 Nishimura et al. ................... 123/295
6,116,208 * 11/2000 Nishimura et al. ................... 123/295
6,141,960 * 11/2000 Takami et al. ......................... 60/286

* cited by examiner

Primary Examiner—Henry C. Yuen
Assistant Examiner—Mahmoud Gimie
(74) Attorney, Agent, or Firm—Nixon Peabody LLP; Donald R. Studebaker

(57) ABSTRACT

Upon refreshing a catalyst (25) in steps SA2 to SA6, the air-fuel ratio of each combustion chamber (4) of an engine (1) is dither-controlled to periodically vary to the rich and lean sides of a target value (A/F=15 to 16) in steps SA16 and SA17. In step SA15, an injector (7) divisionally injects fuel in two injections within the period from the intake stroke to the compression stroke of each cylinder, thus accomplishing weakly stratified combustion. In step SA18, the opening of an EGR valve (27) is controlled to recirculate a large amount of exhaust gas to an intake path (10) so as to achieve around 40% EGR ratio.

14 Claims, 13 Drawing Sheets

CONTROL APPARATUS FOR SPARK IGNITION TYPE DIRECT INJECTION ENGINE

BACKGROUND OF THE INVENTION

1. Field of the Invention

The present invention relates to a control apparatus for a spark ignition type direct injection engine, which can remove nitrogen oxides (NOx) in exhaust gas even at lean air-fuel ratios by inserting an NOx adsorbing catalyst that adsorbs NOx in exhaust gas in an excess oxygen atmosphere into the exhaust path of the engine.

2. Description of the Related Art

Conventionally, as for a control apparatus for an engine of this type, the following control technique is known. That is, the air-fuel ratio of a combustion chamber is controlled to be a predetermined lean state (e.g., A/F≧20) to improve fuel economy, and NOx in exhaust gas that has become an excess oxygen atmosphere at that time is adsorbed and removed by an NOx adsorbing catalyst. Before the adsorbed NOx amount of that NOx adsorbing catalyst becomes excessive and the adsorption performance drops, the air-fuel ratio of the combustion chamber of the engine is switched to a rich one substantially equal to or higher than the stoichiometric air-fuel ratio, thereby releasing NOx from the NOx adsorbing catalyst (to be also referred to as refresh or regeneration of the catalyst).

The technique disclosed in Japanese Patent Laid-Open No. 10-274085 exploits certain characteristics of the aforementioned NOx adsorbing catalyst; it oxidizes NOx in exhaust gas in an excess oxygen atmosphere and adsorbs it in the forms of nitrates, and releases NOx by substituting the adsorbed nitrates by carbon monoxide (CO) in exhaust gas when the oxygen concentration decreases. That is, the oxygen concentration in exhaust gas is decreased upon releasing NOx from the NOx adsorbing catalyst, and the CO concentration in exhaust gas is increased by injecting and re-combusting additional fuel in an expansion or exhaust stroke of each cylinder, thus promoting release and deoxidization/purification of NOx.

Upon releasing NOx from the NOx adsorbing catalyst, the air-fuel ratio of the combustion chamber is normally controlled to stay rich (A/F=12 to 13) so as to decrease the oxygen concentration, and to increase the concentrations of reducible, uncombusted hydrocarbons (HC) and CO. In this manner, release of NOx from the NOx adsorbing catalyst can be promoted, as well as deoxidization/purification of NOx. On the other hand, since extra fuel is consumed to only refresh the catalyst, fuel economy suffers.

In the conventional control apparatus (Japanese Patent Laid-Open No. 10-274085) that injects additional fuel in the expansion or exhaust stroke of each cylinder, the oxygen concentration in exhaust gas can be decreased and the HC and CO concentrations can be increased without any engine output drift. However, since the additional fuel has nearly no contribution to the engine output, fuel economy may deteriorate considerably.

SUMMARY OF THE INVENTION

The present invention has been made in consideration of the above situation, and has as its object to sufficiently improve the refresh effect of a catalyst while minimizing an increase in fuel consumption by devising the control sequence upon refreshing the catalyst in a spark ignition type direct injection engine, exploiting the fact that it is effective for the purpose of promoting refresh of an NOx adsorbing catalyst not only to increase the HC and CO concentrations in exhaust gas but also to especially increase a CO to NOx concentration ratio CO/NOx.

In order to achieve the above object, according to the present invention, upon refreshing an NOx adsorbing catalyst inserted in the exhaust path of an engine, the air-fuel ratio of a combustion chamber is controlled to be slightly leaner than the stoichiometric air-fuel ratio, fuel is divisionally injected in two injections, i.e., leading and trailing injections, and a predetermined amount of exhaust gas is recirculated to an intake system.

More specifically, the invention according to the first aspect is premised on an engine control apparatus which comprises a fuel injection valve 7 for directly injecting and supplying fuel into a combustion chamber 4 in each cylinder of an engine 1, and an NOx adsorbing catalyst 25 which is inserted in an exhaust path 22 that communicates with the combustion chamber 4, adsorbs NOx in an excess oxygen atmosphere with high oxygen concentration in exhaust gas, and releases the adsorbed NOx as the oxygen concentration decreases, as shown in FIG. 1, and which controls the air-fuel ratio of the combustion chamber to stay lean (excessive air ratio λ≧1.3) when the engine 1 falls within a low-load range after warming up the NOx adsorbing catalyst 25.

The control apparatus comprises exhaust gas recirculation means 26 and 27 for recirculating some portion of the exhaust gas from the exhaust path 22 to an intake system 10 of the engine 1, a determination means 40a for determining an NOx release timing from the NOx adsorbing catalyst 25, an air-fuel ratio control means 40b for controlling the air-fuel ratio of the combustion chamber 4 to fall within the range 1 <excessive air ratio λ≦1.1 when the determination means 40a determines that the NOx release timing has been reached, an injection timing control means 40c for controlling the fuel injection valve 7 to divisionally inject fuel in two injections including leading injection that falls within the range from an intake stroke to a former period of a compression stroke of a cylinder 2, and trailing injection which starts after a middle period of the compression stroke and before an ignition timing when the determination means 40a determines that the NOx release timing has been reached, and an exhaust gas recirculation control means 40d for controlling the exhaust gas recirculation means 26 and 27 to recirculate a predetermined amount of exhaust gas when the determination means 40a determines that the NOx release timing has been reached. Note that the middle period of the compression stroke means that of former, middle, and latter periods obtained by equally dividing the compression stroke of each cylinder into three periods.

With the aforementioned arrangement, when the adsorbed NOx amount of the NOx adsorbing catalyst 25 has become excessive during combustion of the engine 1, and the determination means 40a determines that the NOx release timing has been reached, the air-fuel ratio control means 40b controls the air-fuel ratio of the combustion chamber 4 of the engine 1 to fall within the range 1<excessive air ratio λ≦1.1, thus decreasing the oxygen concentration in exhaust gas, and releasing NOx from the NOx adsorbing catalyst 25. At this time, under the control of the injection timing control means 40c, fuel is divisionally injected in two injections including leading injection which falls within the range from the intake stroke to the former period of the compression stroke of the cylinder 2, and trailing injection which starts after the middle period of the compression stroke and before the ignition timing. The leading injected fuel is uniformly scattered into the combustion chamber to form an air-fuel mixture leaner than the stoichiometric air-fuel ratio, and the trailing injected fuel forms an over-enriched air-fuel mixture slightly richer than the stoichiometric air-fuel ratio around a spark plug 6 (this state will be referred to as a weakly stratified state hereinafter).

Combustion in this weakly stratified state has greatly high combustion stability since the over-enriched air-fuel mixture has very high ignitability and also very high initial burning velocity after that, and at the same time, CO is easily produced in that state. On the other hand, the surrounding lean air-fuel mixture burns slowly, and since some mixture is exhausted before it completely burns, the CO concentration in this exhaust gas becomes very high. Furthermore, since the number of times of opening of the fuel injection valve per combustion cycle increases, the ratio of coarse fuel droplets that are injected in an early valve opening stage becomes high, and this also promotes CO production. That is, the CO concentration in exhaust gas becomes greatly higher than that in combined (non-divided) fuel injection.

At the same time, the exhaust gas recirculation control means 40d controls the exhaust gas recirculation means 26 and 27 to recirculate a predetermined amount of exhaust gas to the intake system. At this time, since stability of weakly stratified combustion is very high, as described above, a large amount of exhaust gas can be recirculated and, hence, generation of NOx can be sufficiently suppressed by reducing the maximum combustion temperature by increasing the heat capacity of the combustion chamber 4.

Therefore, since the CO concentration in exhaust gas becomes very high and the NOx concentration becomes sufficiently low by the synergism of weakly stratified combustion and exhaust gas recirculation, the CO/NOx concentration ratio in exhaust gas can be greatly increased. As a result, even when the air-fuel ratio of the combustion chamber 4 is controlled to be leaner than the conventional control, refresh of the NOx adsorbing catalyst 25 can be satisfactorily promoted and, hence, the refresh effect of the NOx adsorbing catalyst can be sufficiently improved while preventing extra fuel from being consumed, i.e., minimizing an increase in fuel consumption.

In the invention according to the second aspect, the determination means in the invention according to the first aspect determines the NOx release timing on the basis of the duration in which the air-fuel ratio of the combustion chamber of the engine is lean. As a result, when the air-fuel ratio of the combustion chamber of the engine is continuously lean over a pre-set duration, it is estimated that the adsorbed NOx amount has become excessive and adsorption performance has dropped, and to cope with this situation the NOx release timing is determined to have been reduced. Note that acceleration of the engine may be used to determine the NOx release timing.

In the invention according to the third aspect, the fuel injection quantity of trailing injection is set to fall within the range from around 20% to around 80% of the total injection quantity of leading and trailing injections in the invention according to the first or second aspect.

That is, when the fuel injection quantity of trailing injection is less than 20% of the total injection quantity, it becomes difficult to form an over-enriched air-fuel mixture with high ignitability around the spark plug of the engine. By contrast, when the fuel injection quantity of trailing injection exceeds 80% of the total injection quantity, the air-fuel mixture around the spark plug becomes too rich and the surrounding lean air-fuel mixture becomes too lean, thus disturbing smooth flame propagation. That is, when the ratio of the fuel injection quantity of trailing injection is set to fall within the aforementioned range, the effect of the invention according to the first aspect can be satisfactorily obtained.

In the invention according to the fourth aspect, the ignition timing control means in the invention according to the third aspect starts leading injection in a former period of the intake stroke of each cylinder. Note that the former period of the intake stroke means that of that of former, middle, and latter periods obtained by equally dividing the intake stroke of each cylinder into three periods.

When leading injection is made in the former period of the intake stroke of each cylinder, even when this injection quantity is large to some extent, the injected fuel sufficiently uniformly diffuses due to an increase in volume of the combustion chamber as a result of the downward stroke of the piston, thus generating a homogeneous air-fuel mixture in the entire combustion chamber. That is, when the total fuel injection quantity is large, the air-fuel mixture in the combustion chamber can be appropriately distributed, and can be burnt by weakly stratified combustion according to the invention.

In the invention according to the fifth aspect, the injection timing control means in the invention according to the third aspect starts leading injection in the former period of the compression stroke of each cylinder. As a result, since fuel injected in the former period of the compression stroke diffuses within a range narrower than that of fuel injected in the intake stroke, and forms an air-fuel mixture, even when the total fuel injection quantity is small, the air-fuel mixture can be appropriately distributed around the spark plug and can be burnt by weakly stratified combustion according to the invention.

In the invention according to the sixth aspect, the injection timing control means in the invention according to the third aspect controls the fuel injection valve to non-divisionally inject fuel after the middle period of the compression stroke of each cylinder to accomplish stratified combustion when the engine falls within a low-load range and no NOx release timing is determined. As a result, when the engine falls within a low-load range and no NOx release timing is determined, so-called stratified combustion is made, thus improving fuel economy.

In the invention according to the seventh aspect, the injection timing control means in the invention according to the sixth aspect controls to inject fuel in the intake stroke in addition to fuel injection made after the middle period of the compression stroke of each cylinder, when the determination means determines that the NOx release timing has been reached. As a result, the control sequence upon switching the fuel injection mode from combined injection to divided injection can be facilitated.

In the invention according to the eighth aspect, the exhaust gas recirculation control means in the invention according to the sixth aspect controls the exhaust gas recirculation means to recirculate exhaust gas when the engine burns on a stratified air-fuel mixture, and proceeds with recirculation of exhaust gas when the determination means determines in that state that the NOx release timing has been reached.

As a result, when the engine burns on a stratified air-fuel mixture and the NOx release timing is reached, exhaust gas is continuously recirculated. Hence, even when the exhaust gas recirculation means has a long action response lag, its adverse influence can be avoided.

In the invention according to the ninth aspect, the air-fuel ratio control means in the invention according to the first aspect periodically changes the air-fuel ratio of the combustion chamber to the sides richer and leaner than a reference value, and the reference value of the air-fuel ratio is set to fall within the range of A/F=15 to 16. In this manner, since the HC and oxygen concentrations periodically vary and the partial pressure of deoxidizing agent components or that of oxygen around the NOx adsorbing catalyst varies, their influences on the NOx adsorbing catalyst can be enhanced, and refresh of the catalyst can be further promoted.

In the invention according to the 10th aspect, the exhaust gas recirculation control means in the invention according to the first aspect controls the exhaust gas recirculation means to recirculate exhaust gas to the intake system at a recirculation ratio of 30% or higher. In this manner, the heat capacity of the combustion chamber of the engine can be sufficiently large, and generation of NOx upon combustion can be appropriately suppressed. With reference to carbon dioxide ($CO_2$) concentration, the recirculation ratio of exhaust gas is given by:

Recirculation ratio=$CO_2$ concentration in intake path—$CO_2$ concentration in air/$CO_2$ concentration in exhaust path—$CO_2$ concentration in intake path

DETAILED DESCRIPTION OF THE PREFERRED EMBODIMENTS

[Overall Arrangement]

Figure 1:
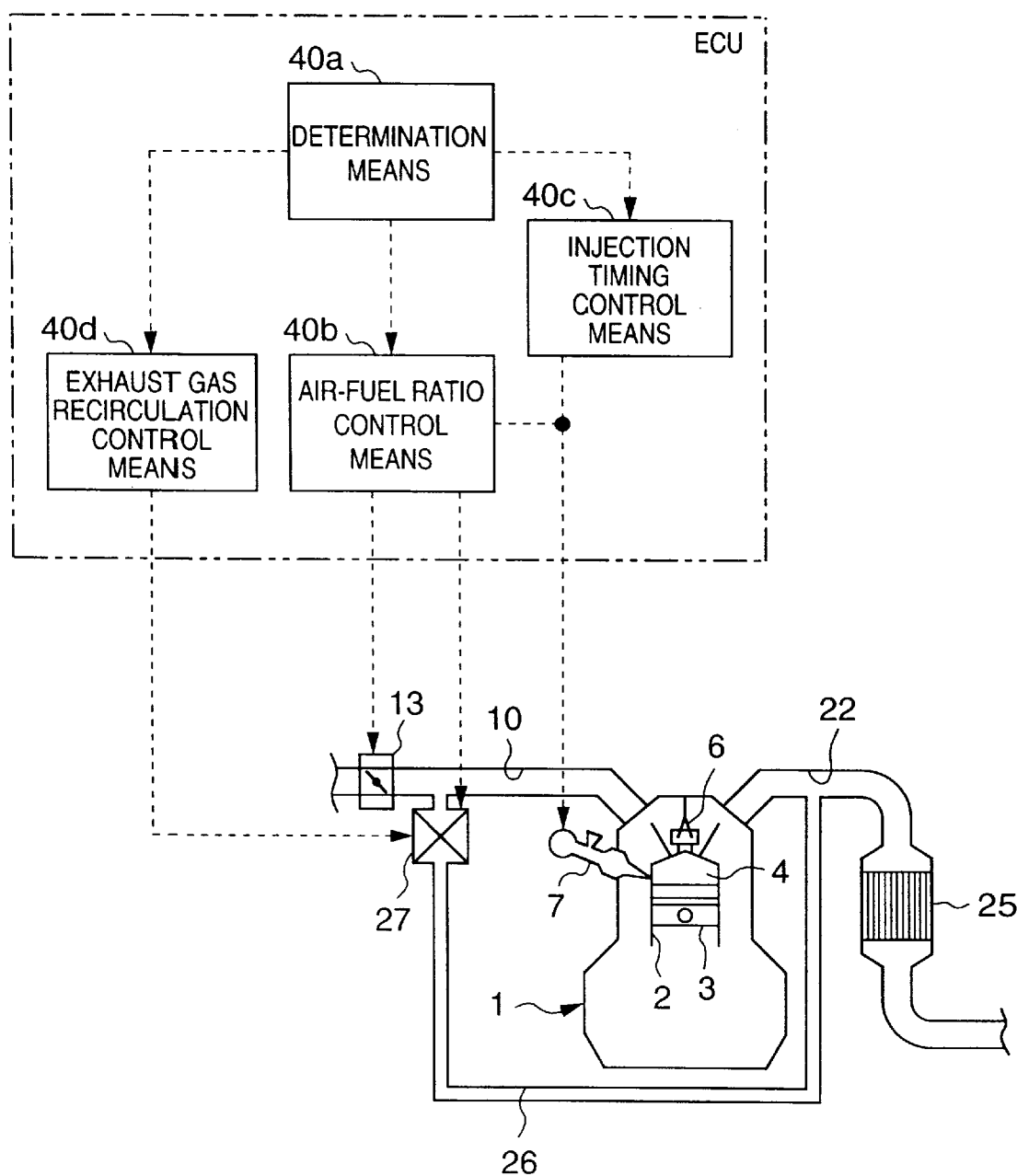
FIG. 1 is an explanatory view showing the arrangement of the present invention.
Figure 2:
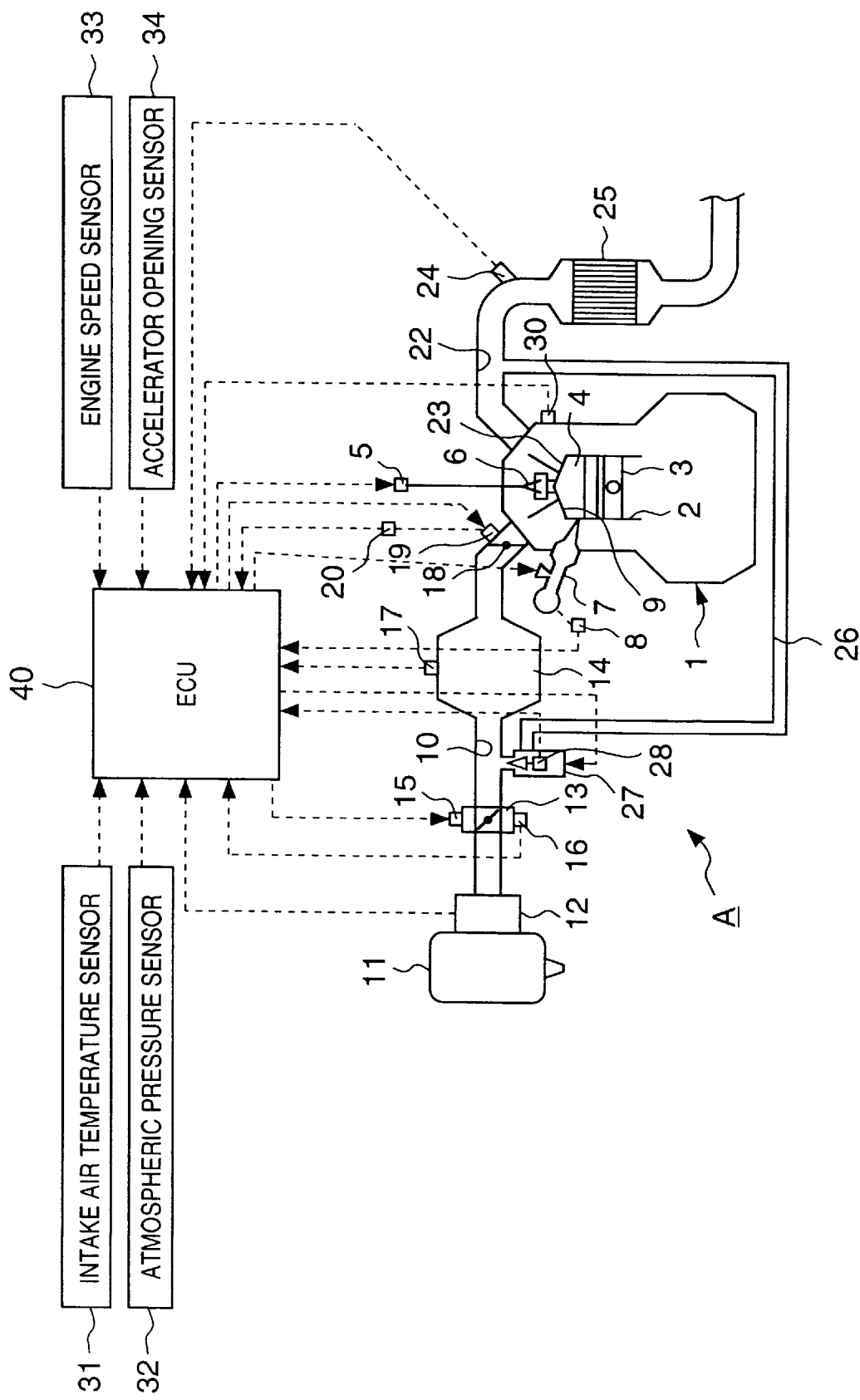
FIG. 2 is a view showing the overall arrangement of a control apparatus for an engine according to an embodiment of the present invention.

FIG. 2 shows the overall arrangement of a control apparatus A for an engine according to an embodiment of the present invention. Reference numeral 1 denotes a multi-cylinder engine mounted on, e.g., a vehicle. The engine 1 has a plurality of cylinders 2 (only one of them is illustrated), and a piston 3 is reciprocally inserted in each cylinder 2, thus defining a combustion chamber 4 in the cylinder 2. At that position of the upper wall of the combustion chamber, which is on the center of a cylinder axis, a spark plug 6 connected to an ignition circuit 5 is attached to face the combustion chamber 4. An injector (fuel injection valve) 7 is attached to the edge portion of the combustion chamber 4 to directly inject and supply fuel into the combustion chamber 4.

A fuel supply circuit (not shown) having a high-pressure fuel pump, pressure regulator, and the like is connected to the injector 7, and supplies fuel to the injector 7 while adjusting fuel from a fuel tank to an appropriate pressure. A fuel pressure sensor 8 detects that fuel pressure. When the injector 7 injects fuel after the middle period of the compression stroke of the cylinder 2, a fuel vapor is trapped by a cavity (not shown) formed at the top surface of the piston 3, thus forming a relatively rich air-fuel mixture layer around the spark plug 6. On the other hand, when the injector 7 injects fuel in the intake stroke of the cylinder 2, a fuel vapor diffuses and mixes with intake air (air), thus forming a homogeneous air-fuel mixture in the combustion chamber 4.

The combustion chamber 4 communicates with an intake path 10 via an intake valve 9 by an intake port (not shown). The intake path 10 supplies intake air filtered by an air cleaner 11 to the combustion chamber 4 of the engine 1, and a hot-wire airflow sensor 12, an electric throttle valve 13 for constricting the intake path 10, and a surge tank 14 are inserted in the path 10 in turn from the upstream side toward the downstream side. The electric throttle valve 13 is not mechanically coupled to an accelerator pedal (not shown) but is driven by a motor 15 to open/close.

Furthermore, a throttle opening sensor 16 for detecting the opening of the throttle valve 13, and an intake air pressure sensor 17 for detecting the intake air pressure in the surge tank 14 are provided.

The intake path 10 branches into independent paths in units of cylinders 2 on the downstream side of the surge tank 14, and the downstream end portion of each independent path further branches into two paths which communicate with intake ports. A swirl control valve 18 is inserted into one of the two branch paths. The swirl control valve 18 is driven by an actuator 19 to open/close. When the swirl control valve 18 is closed, intake air is supplied from only the other branch path to the combustion chamber 4, and generates a strong intake swirl in the combustion chamber 4. On the other hand, as the swirl control valve 18 opens, the intake swirl weakens. Also, a swirl control valve opening sensor 20 for detecting the opening of the swirl control valve 18 is provided.

Referring to FIG. 2, reference numeral 22 denotes an exhaust path for exhausting burnt gas from the combustion chamber 4. The upstream end of the exhaust path 22 branches in units of cylinders 2, and communicates with the combustion chamber 4 via an exhaust valve 23 by an exhaust port (not shown). In the exhaust path 22, an $O_2$ sensor 24 for detecting the oxygen concentration in exhaust gas, and a catalyst 25 for purifying exhaust gas are inserted in turn from the upstream side toward the downstream side. The $O_2$ sensor 24 is used to detect the air-fuel ratio on the basis of the oxygen concentration in exhaust gas, and a so-called lambda $O_2$ sensor whose output is inverted stepwise on the basis of the stoichiometric air-fuel ratio.

The catalyst 25 is of NOx adsorption/deoxidization type that adsorbs NOx in an excess oxygen atmosphere in which the oxygen concentration in exhaust gas is high (e.g., 4% or higher), and releases or desorbes, deoxidizes, and purifies adsorbed NOx as the oxygen concentration decreases. Especially around the stoichiometric air-fuel ratio, the catalyst 25 exhibits exhaust gas purification performance as high as that of a so-called three-way catalyst.

Figure 3:
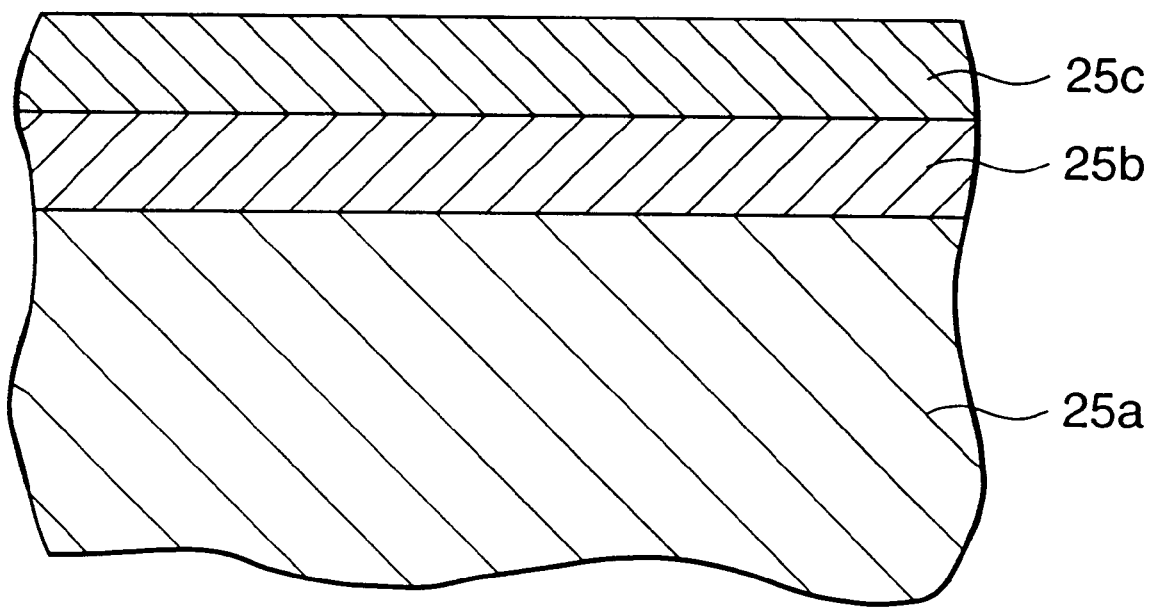
FIG. 3 is a schematic sectional view showing the structure of a catalyst.

As shown in FIG. 3, the catalyst 25 has a carrier 25a with a cordierite honeycomb structure, and a two-layered coat including an inner catalyst layer 25b and outer catalyst layer 25c is formed on the wall surfaces of through holes formed in the carrier 25. The inner catalyst layer 25b carries a rare metal such as platinum (Pt) and barium (Ba) serving as an NOx adsorbent using a support material such as alumina or ceria as a porous material. On the other hand, the outer catalyst layer 25c carries Pt, rhodium (Rh), and Ba as catalyst metals using a support material such as zeolite as a porous material.

In place of barium, at least one of an alkali earth metal other than barium, an alkali metal such as sodium (Na) or the like, or a rare earth metal may be used. Zeolite may be used as the support material of the inner catalyst layer 25b, and in this case, alumina or ceria may be used as that of the outer catalyst layer 25c. Furthermore, the catalyst 25 may use a single-layer coat type, in which a catalyst layer that carries alumina or ceria as a support material is formed on the wall surface of a carrier, and the support material carries a rare metal such as platinum (Pt), rhodium (Rh), paradigm (Pd), or the like, and an alkali metal such as a potassium (K) or the like or an alkali earth metal such as barium (Ba) or the like.

The upstream end of an EGR path 26 for recirculating some exhaust gas to the intake system is branch-connected to the exhaust path 22 on the upstream side of the $O_2$ sensor 24. The downstream end of the EGR path 26 is connected to the intake path 10 between the throttle valve 13 and surge tank 14, and an electric EGR valve 27 whose opening is adjustable is inserted in the path 26 in the vicinity of the intake path 10 so as to adjust the recirculation amount of exhaust gas by the EGR path 26. The EGR path 26 and EGR valve 27 construct an exhaust gas recirculation means. Also, a lift sensor 28 for detecting the lift amount of the EGR valve 27 is provided.

The operations o f the ignition circuit 5 of the spark plug 6, the injector 7, the driving motor 15 of the electric throttle valve 13, the actuator 19 of the swirl control valve 18, the electric EGR valve 27, and the like are controlled by a control unit (to be referred to as an ECU hereinafter) 40. The ECU 40 receives the output signals from the airflow sensor 12, throttle opening sensor 16, intake air pressure sensor 17, swirl control valve opening sensor 20, $O_2$ sensor 24, and lift sensor 28 of the EGR valve 27, and also receives the output signals from a water temperature sensor 30 for detecting cooling water temperature (engine water temperature) of the engine 1, an intake air temperature sensor 31 for detecting intake air temperature, an atmospheric pressure sensor 32 for detecting atmospheric pressure, an engine speed sensor 33 for detecting engine speed, and an accelerator opening sensor 34 for detecting accelerator opening (accelerator pedal stroke).

[Outline of Control]

The ECU 40 determines, as control parameters pertaining to the engine output, the fuel injection quantity and timing by the injector 7, the intake air amount adjusted by the throttle valve 13, the intake swirl strength adjusted by the swirl control valve 18, the recirculation amount of exhaust gas adjusted by the EGR valve 27, and the like, on the basis of the running state of the engine 1. In this manner, the fuel injection pattern of the injector 7 is switched in correspondence with the running state of the engine 1, and the engine 1 operates in different combustion states (running modes). More specifically, as shown in, e.g., FIG. 4, while the engine 1 is warm, a predetermined range (I) on the low-load side corresponds to a stratified combustion range, and sets a combustion mode for controlling the injector 7 to non-divisionally inject fuel after the middle period of the compression stroke, and combusting fuel in a stratified state in which an air-fuel mixture is locally present around the spark plug 6 (see FIG. 5A). In this stratified combustion mode, the opening of the throttle valve 13 is set to be large to reduce pump losses of the engine 1, and as a result, the average air-fuel ratio of the combustion chamber 4 is very lean (e.g., A/F=30).

Figure 4:
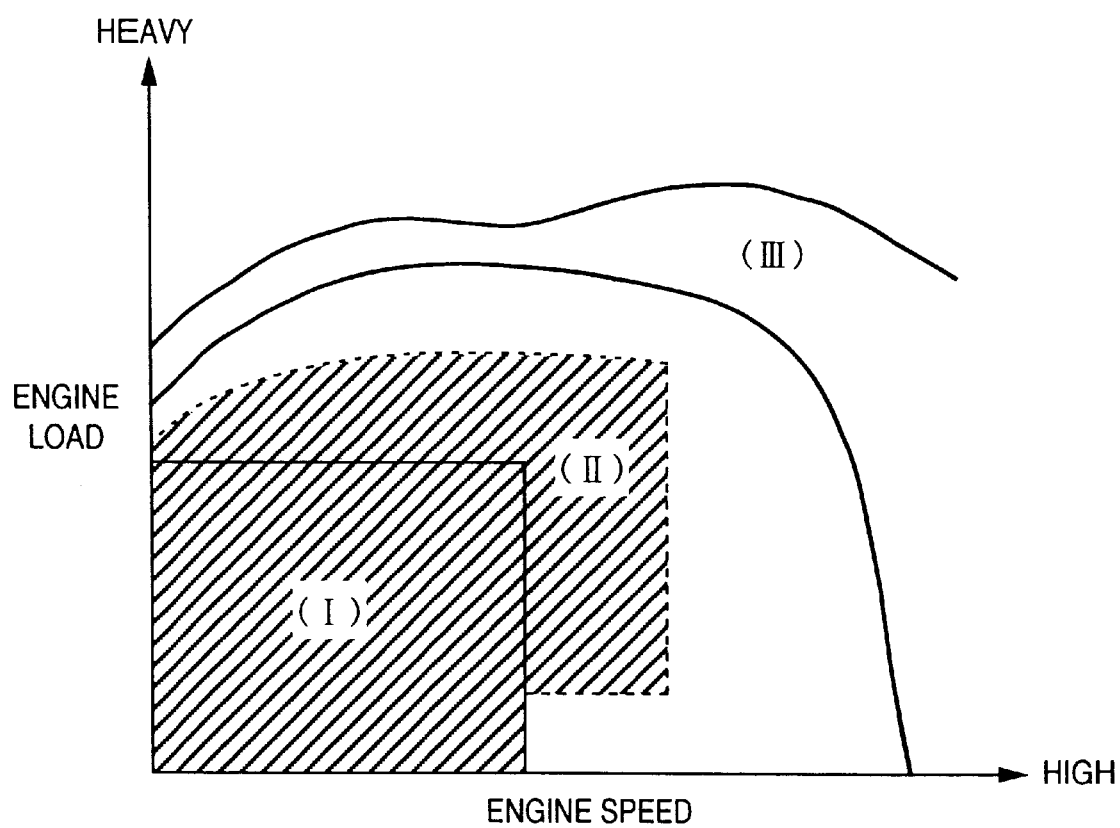
FIG. 4 is a graph showing an example of a control map which sets combustion ranges of a stratified combustion mode, stoichiometric mode, and enrich mode of an engine.
Figure 5:
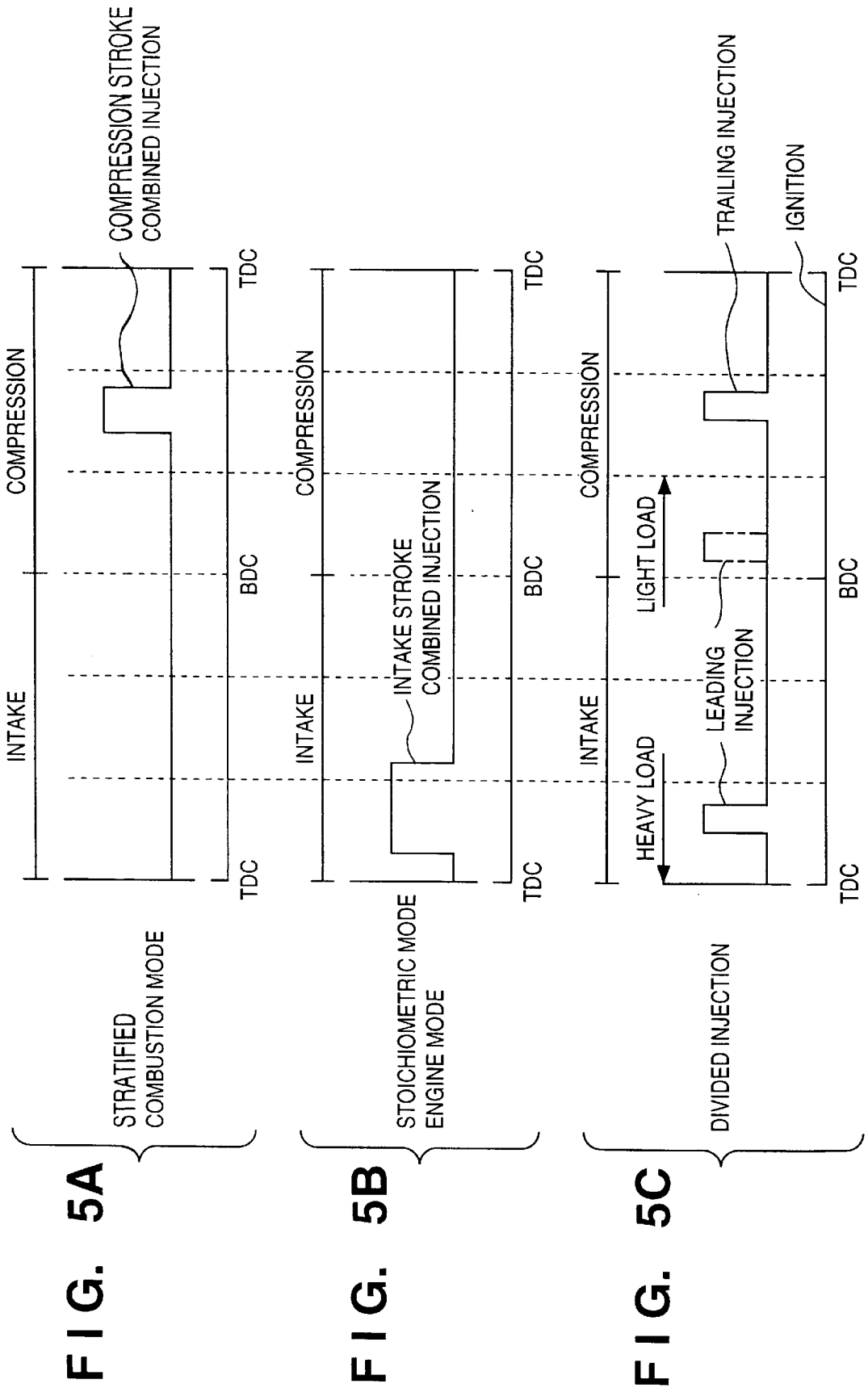
FIGS. 5A to 5C are timing charts showing the fuel injection timings of the engine.

On the other hand, combustion ranges (II) and (III) in FIG. 4 correspond to uniform combustion ranges and set a combustion mode for controlling the injector 7 in the former period of the intake stroke and combusting fuel after the fuel sufficiently mixes with intake air to form a homogeneous air-fuel mixture in the combustion chamber (see FIG. 5B). In the low-load side range (II) of this uniform combustion mode, the fuel injection quantity, throttle opening, and the like are controlled so that the air-fuel mixture in the combustion chamber has a substantially stoichiometric air-fuel ratio (A/F=14.7) (to be referred to as a stoichiometric mode hereinafter). In the high-load or high-rotational speed side combustion range (III), the air-fuel ratio is controlled to be slightly richer than the stoichiometric air-fuel ratio (e.g., A/F=13 to 14) to obtain a high output (to be referred to as an enrich mode hereinafter).

In the hatched range of the control map shown in FIG. 4, the EGR valve 27 is opened to recirculate some portion of the exhaust gas to the intake path 10 by the EGR path 26. As a result, the heat capacity of the combustion chamber 4 is increased, and generation of NOx upon combustion can be suppressed. On the other hand, while the engine is cold, all the combustion ranges of the engine are set to be uniform combustion ranges to assure high combustion stability, although not shown.

[Fuel Injection Control for Catalyst Refresh]

As described above, in this embodiment the engine 1 runs by stratified combustion in the low-load range to greatly improve fuel economy, and adopts the so-called adsorption/deoxidization type catalyst 25 to be able to remove NOx in exhaust gas in an excess oxygen atmosphere when the air-fuel ratio is very lean like that in stratified combustion. In order to stably obtain high purification performance of the catalyst 25, when the adsorbed NOx amount of the catalyst 25 becomes large to some extent, the adsorbed NOx is released to make deoxidization/purification (refresh of the catalyst).

In order to refresh the catalyst 25, the air-fuel ratio of the combustion chamber 4 is controlled to be around the stoichiometric air-fuel ratio to decrease the oxygen concentration in exhaust gas as in the conventional apparatus. At this time, as a characteristic feature of the present invention, fuel injection by the injector 7 is divided into two injections to obtain weakly stratified combustion, thereby greatly increasing the CO concentration in exhaust gas and setting an EGR ratio (exhaust gas recirculation ratio) much higher than the conventional apparatus (to be referred to as heavy EGR hereinafter) to sufficiently suppress generation of NOx upon combustion. By the synergism of weakly stratified combustion and exhaust gas recirculation, refresh of the catalyst 25 is promoted.

The processing sequence of refresh of the catalyst 25 will be described in detail with reference to the flow charts shown in FIGS. 6 to 8.

Figure 6:
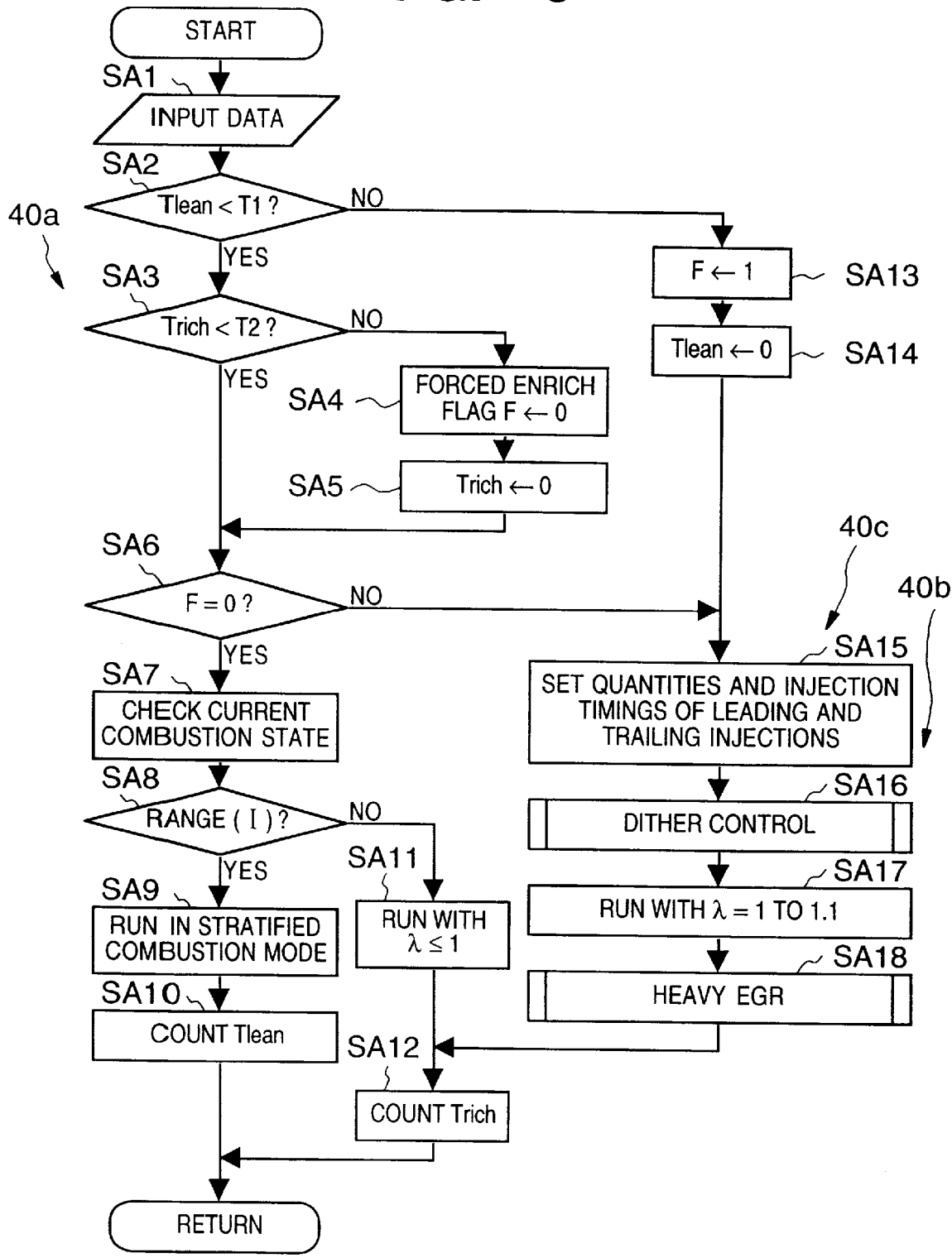
FIG. 6 is a flow chart showing the control sequence for refreshing the catalyst.

As shown in the flow chart in FIG. 6, in step SA1 after the flow starts, various sensor signals from the airflow sensor 12, $O_2$ sensor 24, water temperature sensor 30, engine speed sensor 33, accelerator opening sensor 34, and the like are received, and various data are input from the memory of the ECU 40. In step SA2, a value Tlean of a lean combustion counter for accumulating the time for which the engine 1 runs in the stratified combustion mode is loaded, and it is checked if the accumulated value is smaller than a first set value T1. Since the first set value T1 is set in correspondence with the time until the adsorbed NOx amount of the catalyst 25 becomes excessive due to lean combustion of the engine 1 and the adsorption performance of the catalyst 25 drops, if NO is determined in step SA2, it is determined that the NOx release timing (NOx release period) from the catalyst 25 has been reached, and the flow advances to step SA13; if YES is determined in step SA2, the flow advances to step SA3.

In step SA3, in turn, a value Trich of a rich combustion counter for accumulating the combustion time in the NOx release period and the time for which the engine 1 runs in the stoichiometric mode or enrich mode is loaded, and it is checked if the loaded value is smaller than a second set value T2. If YES is determined in step SA3, this means that NOx is not sufficiently released from the catalyst 25. In this case, the flow advances to step SA6. On the other hand, if NO is determined in step SA3, it is determined that the catalyst 25 has sufficiently released NOx, and the flow advances to step SA4 to turn off a forced rich flag F (F=0). The forced rich flag F indicates that the air-fuel ratio of the combustion chamber 4 of the engine 1 is forcibly changed to that around the stoichiometric air-fuel ratio to refresh the catalyst 25 during the NOx release period. Subsequently, the rich combustion counter is reset (Trich=0) in step SA5, and the flow advances to step SA6.

It is checked in step SA6 after step SA3 or SA5 if the forced rich flag F is OFF. If the flag F is ON (F=1), i.e., NO in step SA6, it is determined that the NOx release period has been reached, and the flow advances to step SA15 (to be described later); if the flag F is OFF (F=0), i.e., YES in step SA6, it is determined that the NOx release period is not reached yet, and the flow advances to step SA7. The current combustion state of the engine 1 is determined on the basis of the load state, engine speed, and the like of the engine 1 in step SA7, and it is then checked in step SA8 if the current combustion state of the engine 1 falls within the range (I).

If YES in step SA8, the flow advances to step SA9 to operate the engine 1 in the stratified combustion mode. In step SA10, the value Tlean of the lean combustion counter is counted up, and the flow then returns. On the other hand, if NO in step SA8, the flow advances to step SA11 to operate the engine 1 in the stoichiometric mode or enrich mode ($\lambda \leq 1$) in correspondence with the load state, engine speed, and the like of the engine 1. Subsequently, the value Trich of the rich combustion counter is counted up in step SA12, and the flow then returns.

That is, if the NOx release period for refreshing the catalyst 25 is not reached, the engine 1 runs in one of the combustion modes corresponding to its combustion state, and if the engine runs in the stratified combustion mode, the lean combustion counter accumulates that time; if the engine runs in the stoichiometric mode or enrich mode, the rich combustion counter accumulates that time.

On the other hand, if it is determined in step SA2 that the NOx release period has been reached, and the flow advances to step SA13, the forced rich flag F is turned on (F=1), and the value Tlean of the lean combustion counter is reset (Tlean=0) in step SA14. In steps SA15 to SA17, control for refreshing the catalyst 25 is done. That is, in step SA15 leading and trailing injection quantities qinjp and qinjd of fuel which are corrected to be larger than the normal amount are set to control the air-fuel ratio of the combustion chamber 4 of the engine 1 to be slightly leaner than the stoichiometric air-fuel ratio ($1 \leq \lambda \leq 1.1$), and their injection timings thtinjp and thtinjd are set.

More specifically, the total injection quantity of the leading and trailing injections is computed on the basis of an intake charging amount computed from the output values of the airflow sensor 12 and the like and a target value (reference value: A/F=15 to 16) of the air-fuel ratio, and is divided into leading and trailing injection quantities in accordance with a predetermined dividing ratio, and injection pulse widths corresponding to the divided injection quantities qinjp and qinjd are set on the basis of the flow rate characteristics of the injector 7. Note that the dividing ratio of the fuel injection quantity is read out from a map, since an optimal value is experimentally set in advance in correspondence with the combustion state of the engine 1, and is electronically stored in the memory of the ECU 40 as a map.

Figure 9:
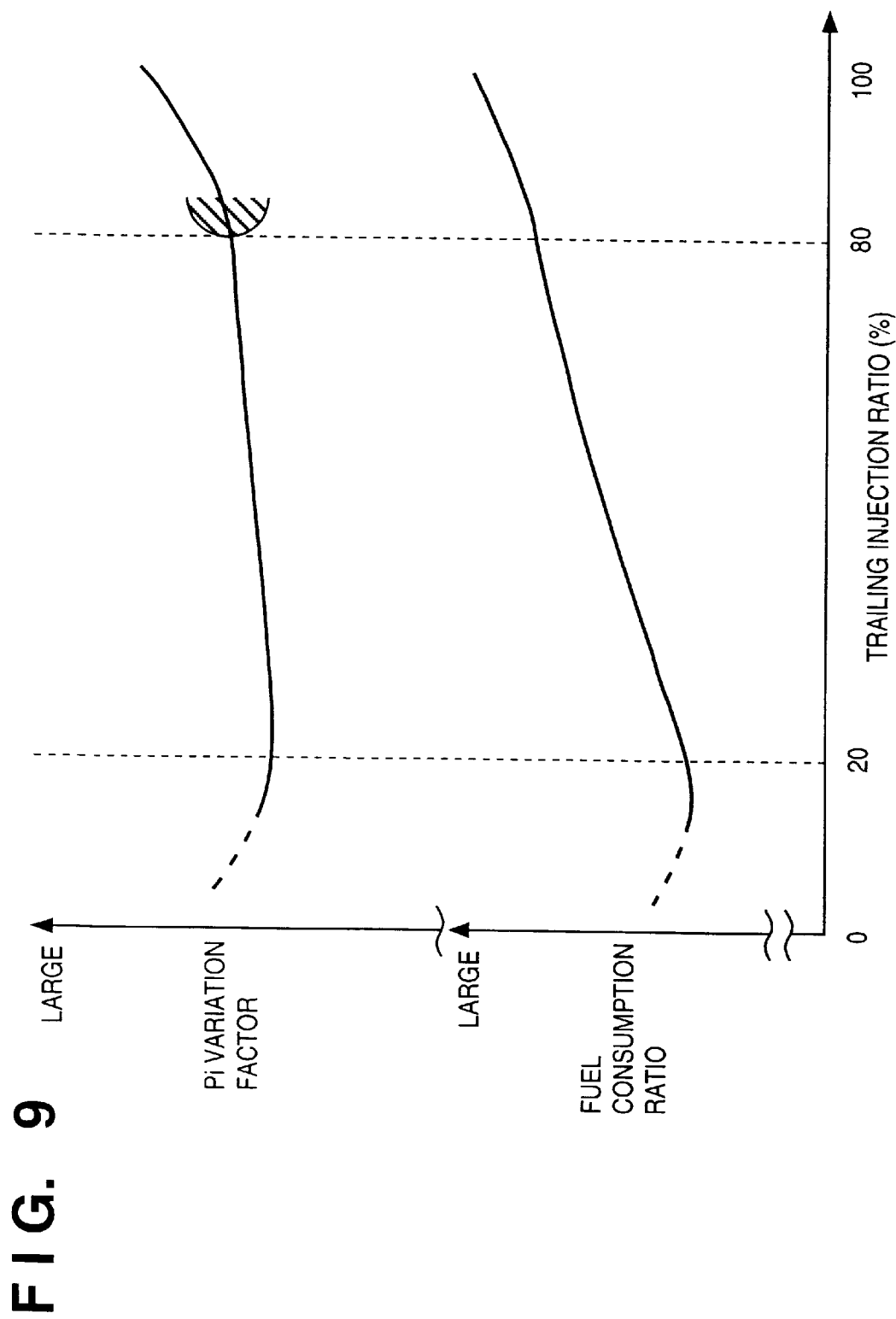
FIG. 9 is a graph showing changes in Pi variation factor and fuel consumption upon changing the trailing injection ratio in divided injection.

The dividing ratio of the fuel injection quantity is set so that that the trailing injection quantity qinjd falls within the range from 20 to 80% of the total injection quantity. As shown in, e.g., FIG. 9, if the trailing injection quantity qinjd is less than 20% of the total injection quantity, it becomes difficult to form an over-enriched air-fuel mixture with high ignitability around the spark plug 6 by the trailing injection, resulting in poor combustibility (increases in Pi variation factor and fuel consumption factor shown in FIG. 9). By contrast, when the trailing injection quantity qinjd exceeds 80% of the total injection quantity, the air-fuel mixture around the spark plug becomes too rich, resulting in poor ignitability, and the surrounding lean air-fuel mixture becomes too lean, thus disturbing smooth flame propagation. In this case as well, combustibility suffers.

The leading injection and trailing injection timings are also set in advance as a map in correspondence with the combustion state of the engine 1. More specifically, as shown in FIG. 5C, the trailing injection timing is set to fall within a narrow range after the middle period of the compression stroke of each cylinder and before the ignition timing, while the leading injection timing is set on the lead angle side as the load state of the engine 1 is higher or set on the lag angle side as the load state is lower and the fuel injection quantity is smaller, within a broad range from the former period of the intake stroke of each cylinder to that of the compression stroke.

In step SA16, the target injection quantity is changed on the basis of the leading and trailing injection quantities qinjp and qinjd set in step SA15 to periodically change the air-fuel ratio of the combustion chamber 4 of the engine 1 within the range of $\lambda$=1 to 1.1 between the rich and lean sides (dither control). In step SA17, divided injection of fuel is executed. As a result, an air-fuel mixture slightly leaner than the stoichiometric air-fuel ratio as an average is combusted in a weakly stratified state in the combustion chamber 4. At this time, the throttle valve 13 may be slightly closed to reduce variations of the engine output.

Figure 7:
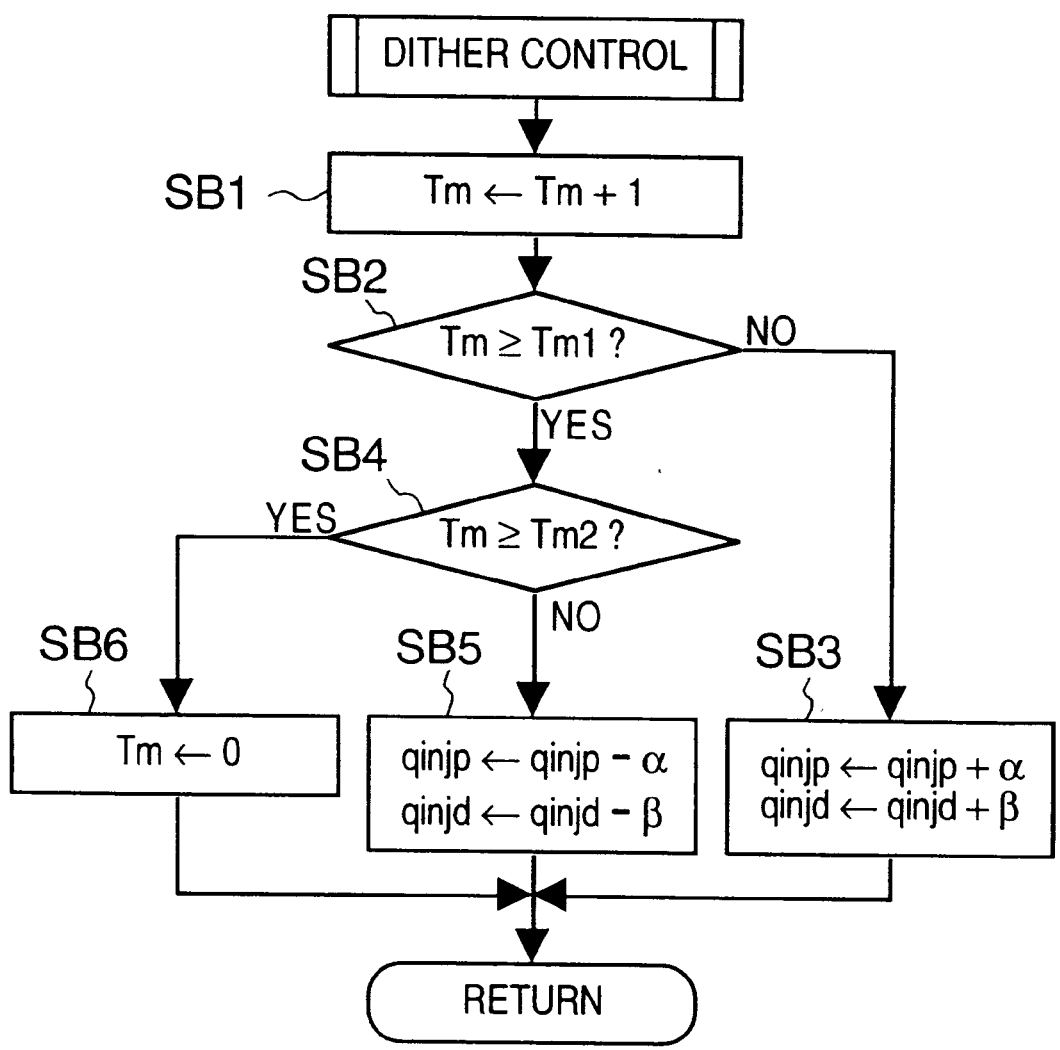
FIG. 7 is a flow chart showing the processing sequence of dither control.

FIG. 7 is a flow chart showing the sequence of the dither control in step SA16 in detail. As shown in FIG. 7, a dither timer value Tm (initial value=0) for counting the variation period of the fuel injection quantity is incremented (Tm=Tm+1) in step SB1, and is compared with a threshold value Tm1 which is set in correspondence with half the variation period in step SB2. While Tm<Tm1 (NO in step SB2), the flow advances to step SB3 and constants α and β are respectively added to the leading and trailing injection quantities qinjp and qinjd. After that, the flow returns to the main routine.

On the other hand, if Tm≧Tm1 (YES in step SB2), the flow advances to step SB4, and the dither timer value Tm is compared in turn with a threshold value Tm2 which is set in correspondence with the variation period. While Tm<Tm2 (NO in step SB4), the flow advances to step SB5 to decrease constants α and β from the leading and trailing injection quantities qinjp and qinjd; if Tm≧Tm2, the flow advances to step SB6 to reset the dither timer value Tm (Tm=0), and the flow then returns to the main routine. With this control, every time the dither timer value Tm changes by Tm1, since the intake stroke injection quantity by the injector 7 alternately changes to qinjp+α and qinjp−α, and the compression stroke injection quantity also alternately changes to qinjd+β and qinjd−β, the air-fuel ratio of the combustion chamber 4 periodically changes to the rich or lean side with respect to the target value within the range of A/F=15 to 16, and the concentrations of CO, HC, $O_2$, and the like in exhaust gas vary accordingly.

In step SA18 after step SA17, the opening of the EGR value 27 is controlled to accomplish heavy EGR, and the flow advances to step SA12 mentioned above to count up the value Trich of the rich combustion counter. After that, the flow returns.

The processing sequence of the EGR control will be explained in detail below with reference to the flow chart shown in FIG. 8. In step SC1 after the flow starts, various sensor signals from the airflow sensor 12, engine speed sensor 33, and the like are received, and various data are received from the memory of the ECU 40. In step SC2, a target EGR ratio corresponding to the combustion state of the engine 1 is computed, and an opening of the EGR valve 27 that can achieve the computed target EGR ratio is set as a basic controlled variable EGRb. Note that the target EGR ratio is set in advance in correspondence with the intake charging amount or engine speed by bench tests, and is stored as a map in the memory of the ECU 40.

It is then checked in step SC3 if heavy EGR is to be set (see step SA17 in FIG. 6). If YES in step SC3, the flow advances to step SC4 to compute a correction value EGRc for correcting the opening of the EGR valve 27. More specifically, the target opening of the EGR valve 27 that can set around 40% EGR ratio is computed on the basis of the airflow sensor output, engine speed, and the like, and a correction value EGRc that increases the current opening of the EGR valve 27 that can be computed from the signal output from the lift sensor 28 to the target opening is computed. On the other hand, if NO in step SC3, the flow advances to step SC5 to set zero correction value EGRc (EGRc=0)

Following step SC4 or SC5, the basic controlled variable EGRb and correction value EGRc are added to each other to obtain a final controlled variable EGRt in step SC6, and a control signal is output to the EGR valve 27 in step SC7 to drive the EGR valve 27. After that, the flow returns to the main routine. That is, upon refreshing the catalyst 25, the opening of the EGR valve 27 is corrected to accomplish the heavy EGR state with around 40% EGR ratio, which is much higher than the conventional apparatus.

Steps SA2 to SA6 shown in the flow chart in FIG. 6 construct the determination means 40a that determines a predetermined NOx release period in which NOx is to be released from the catalyst 25.

Steps SA15 to SA17 construct the air-fuel ratio control means 40b which controls the air-fuel ratio of the combustion chamber 4 of the engine 1 to fall within the range of 1≦excessive air ratio λ≦1.1 when the determination means 40a determines that the NOx release period has been reached. The air-fuel ratio control means 40b forcibly increases/decreases the fuel injection quantity by the injector 7 by dither control, as shown in the flow chart in FIG. 7, to periodically change the air-fuel ratio of the combustion chamber 4 between the rich and lean sides.

Furthermore, step SA15 constructs the injection timing control means 40c for controlling the injector 7 to divisionally inject fuel in two injections including leading injection that falls within the range from the intake stroke to the former period of the compression stroke of each cylinder, and trailing injection after the middle period of the compression stroke and before the ignition timing. The injection timing control means 40c sets the leading injection timing in the former period of the intake stroke when the load state of the engine 1 is high, or sets it in the former period of the compression stroke when the load state is low.

Figure 8:
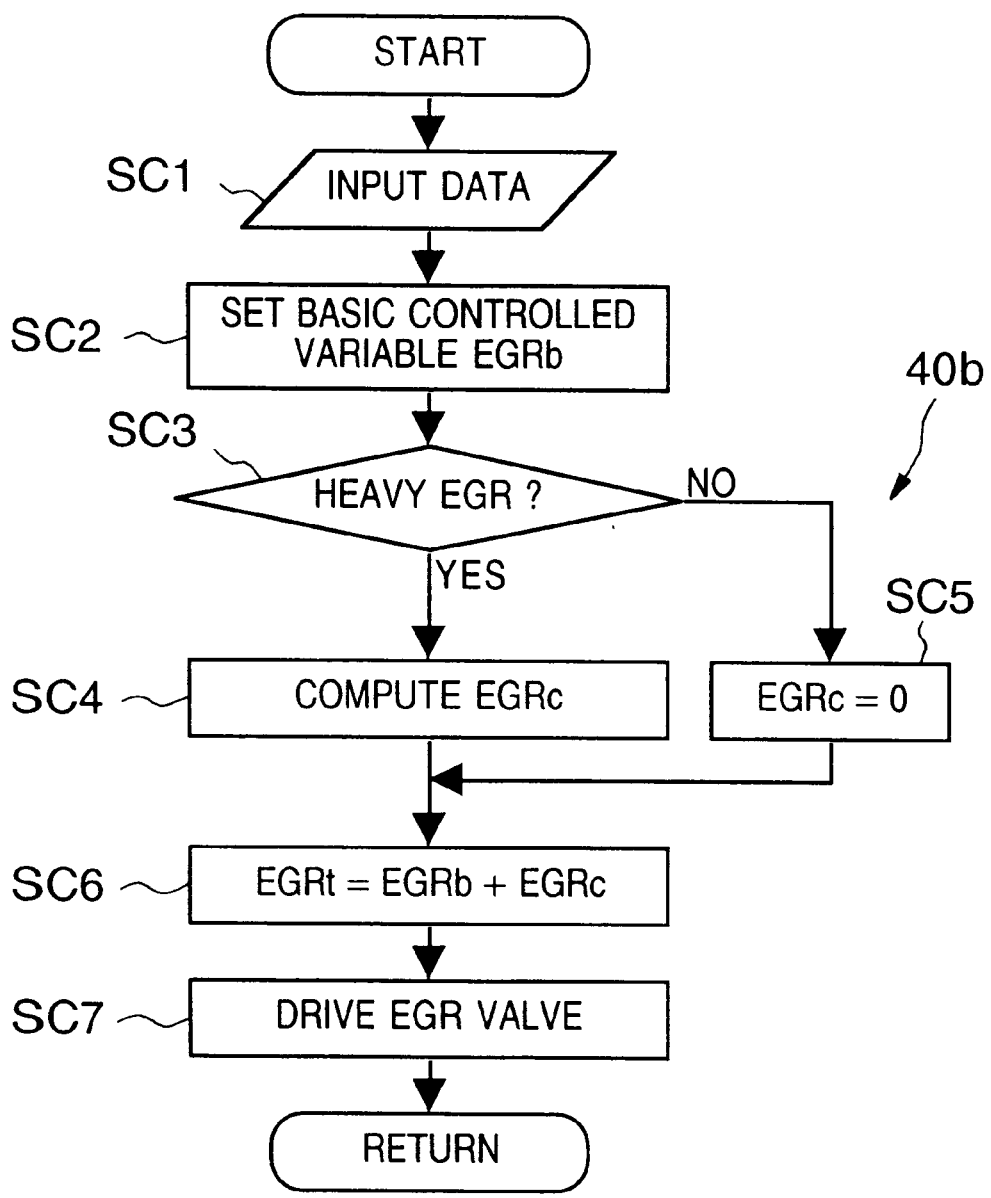
FIG. 8 is a flow chart showing the processing sequence of exhaust gas recirculation control.

The respective steps in the flow chart in FIG. 8 construct the exhaust gas recirculation control means 40d for recirculating exhaust gas when the engine 1 runs in the stratified combustion mode, and for proceeding with recirculation of exhaust gas and controlling the opening of the EGR valve 27 to accomplish the heavy EGR state when the determination means 40a determines in this state that the NOx release period has been reached.

[Effect of This Embodiment]

The effects of this embodiment will be explained below.

The engine 1 of this embodiment runs in the stratified combustion mode for steady combustion in a low-load range, and NOx in exhaust gas in an excess oxygen atmosphere is adsorbed and removed by the catalyst 25 at that time. When the accumulated value Tlean of the lean combustion time has exceeded the first set value T1, the forced rich flag F is turned on (F=1), and control for releasing NOx is done, as shown in steps SA15 to SA17 in the flow chart in FIG. 6.

More specifically, the total fuel injection quantity is corrected to increase, and the intake air amount is decreased by controlling the throttle valve 13 and EGR control, thus controlling the air-fuel ratio of the combustion chamber 4 of the engine 1 to fall within the range of λ=1 to 1.1.

At the same time, the air-fuel mixture in the combustion chamber 4 of the engine 1 is weakly stratified by divided injection of fuel. More specifically, fuel leading injected by the injector 7 uniformly diffuses to form a lean air-fuel mixture, while trailing injected fuel forms an over-enriched air-fuel mixture around the spark plug 6, and a flame ignited in this over-enriched air-fuel mixture propagates to the surrounding lean air-fuel mixture.

Figure 10:
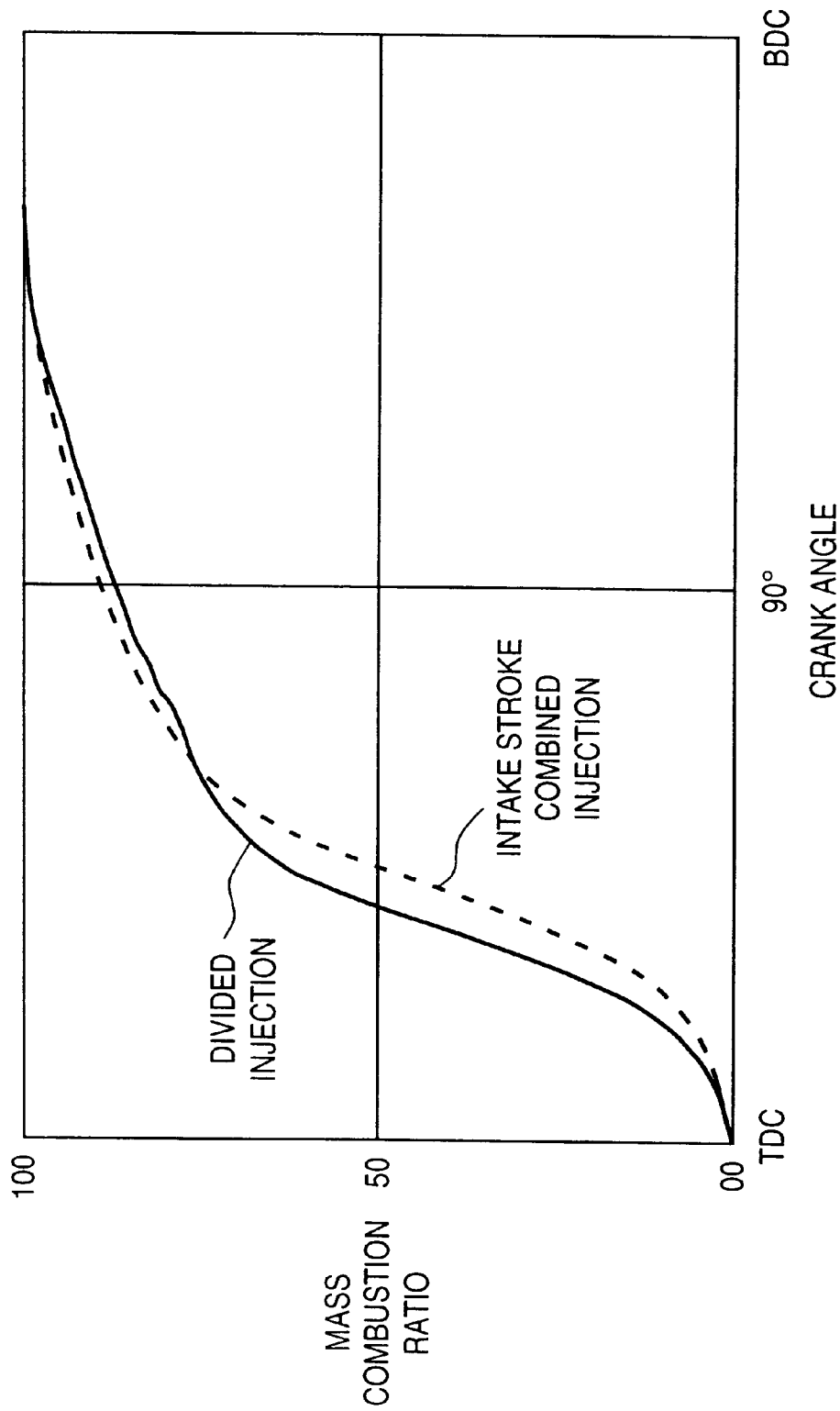
FIG. 10 is a graph showing a change in mass combustion ratio after ignition in weakly stratified combustion in comparison with uniform combustion.

In this weakly stratified combustion, the over-enriched air-fuel mixture has very high ignitability and also very high initial burning velocity after that, and combustion stability improves greatly. Upon examining this fact in terms of the mass combustion ratio of an air-fuel mixture after ignition shown in, e.g., FIG. 10, in case of divided injection indicated by the solid curve in FIG. 10, combustion progresses in its early stage much faster than combined (non-divided) injection in the intake stroke indicated by the broken curve, and this reveals that combustion stability becomes very high. Also, in FIG. 10, the mass combustion ratio of divided injection is smaller than that of combined injection in the intake stroke after the middle period of the combustion stroke, and this reveals that the surrounding lean air-fuel mixture is combusted slowly.

As described above, in weakly stratified combustion, the over-enriched air-fuel mixture has high burning velocity and CO is easily generated due to local oxygen starvation. Also, since the lean air-fuel mixture is combusted slowly, some fuel is exhausted before it is burnt, and the CO concentration in this exhaust gas further increases. Furthermore, since the number of times of opening of the fuel injection valve per combustion cycle increases, the ratio of coarse fuel droplets that are injected in an early valve opening stage becomes high, and this also promotes CO production. That is, weakly stratified combustion can greatly increase the CO concentration in exhaust gas compared to that in uniform combustion which non-divisionally injects fuel.

Simultaneously with the air-fuel ratio control and the divided fuel injection control, the opening of the EGR valve 27 is controlled to obtain heavy EGR. That is, exploiting the fact that combustion stability improves due to weakly stratified combustion, a large amount of exhaust gas is recirculated to make the EGR ratio (e.g., around 40%) much higher than the conventional apparatus. In this heavy EGR state, since the heat capacity of the combustion chamber 4 increases, and the maximum combustion temperature is appropriately suppressed, generation of NOx can be sufficiently suppressed. In addition, in this embodiment, when the engine 1 runs in the stratified combustion mode, the EGR valve 27 is opened to recirculate exhaust gas. Hence, when the NOx release period has been reached in that state, the amount of exhaust gas to be recirculated can only be increased by increasing the opening of the EGR valve 27 while proceeding with recirculation of exhaust gas. For this reason, even when the exhaust gas recirculation means has a long action response lag, its adverse influence can be avoided.

Figure 11:
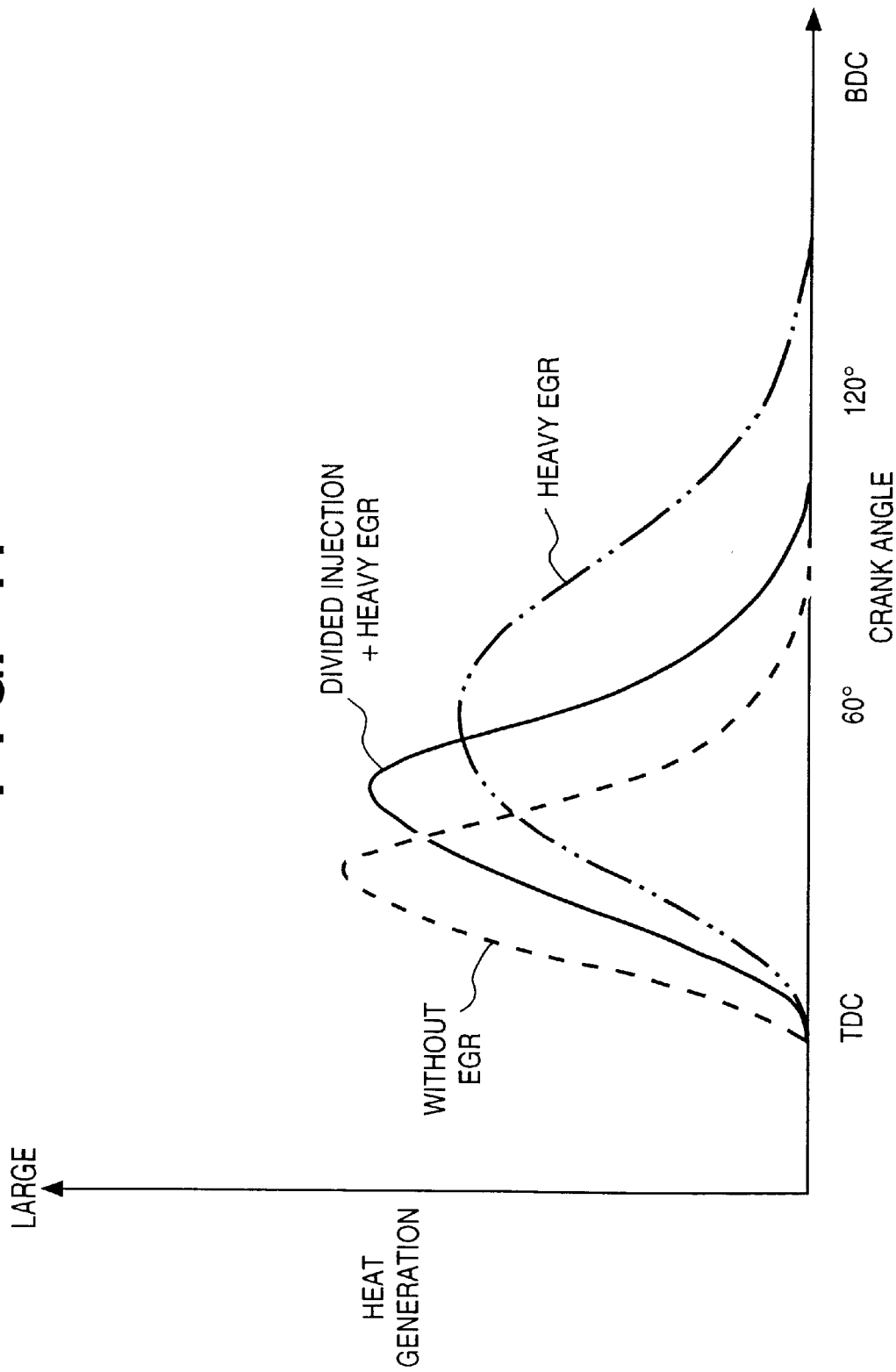
FIG. 11 is a graph showing the change characteristics of heat generation upon combination of weakly stratified combustion with heavy EGR in comparison with heavy EGR in uniform combustion.

A combination of divided fuel injection and heavy EGR will be described in detail below with reference to FIG. 11. FIG. 11 shows a change in heat generation upon combustion as a function of a change in crank angle after ignition when the air-fuel ratio of the combustion chamber 4 is controlled to be substantially equal to the stoichiometric air-fuel ratio by non-divisionally injecting fuel in the intake stroke by the injector 7. As indicated by the imaginary curve in FIG. 11, with heavy EGR in which a large amount of exhaust gas is recirculated, combustion progresses very slowly and such slow combustion continues up to the middle period of the expansion stroke compared to a state (without EGR) in which no exhaust gas is recirculated, as indicated by the broken curve. Since such slow combustion considerably impair fuel consumption due to a drop of mechanical efficiency, and misfire is highly likely to occur, this combustion state cannot be used in practice.

By contrast, when heavy EGR is combined with weakly stratified combustion of fuel by means of divided injections, heat generation exhibits change characteristics that are practically preferred, as indicated by the solid curve in FIG. 11. More specifically, when heavy EGR is combined with weakly stratified combustion by means of divided injections, heavy EGR that can recirculate a large amount of exhaust gas can be realized without impairing fuel economy.

As described above, by combining weakly stratified combustion and heavy EGR, since the CO concentration in exhaust gas can improve very much and the NOx concentration can be sufficiently deoxidized due to their synergism, the CO/NOx concentration ratio in exhaust gas becomes very high, thus sufficiently promoting refresh of the catalyst 25.

Figure 12A:
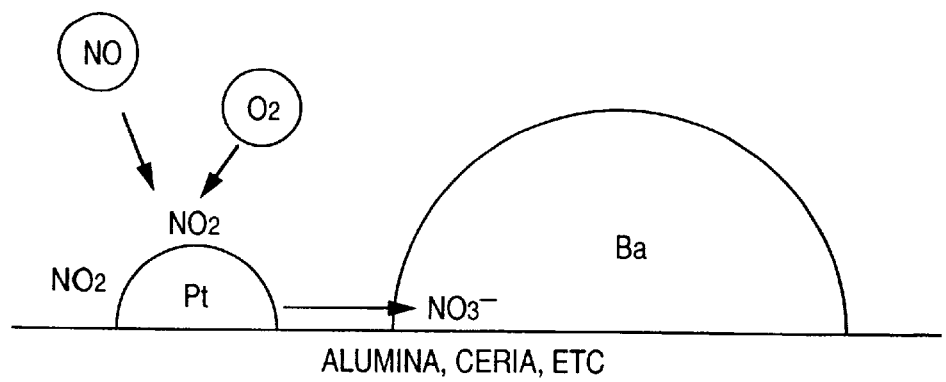
FIG. 12A is an explanatory view showing the mechanism of NOx adsorption in an excess oxygen atmosphere by an NOx adsorbing catalyst.

There are various theories concerning the mechanism of NOx adsorption and deoxidization/purification in the catalyst 25, and they are roughly as follows. More specifically, in exhaust gas in an excess oxygen atmosphere, as shown in FIG. 12A, NO and $O_2$ react on platinum (Pt) as active species of the catalyst 25 to produce $NO_2$, and some $NO_2$ is further oxidized on platinum (Pt) and is adsorbed by barium (Ba) serving as an adsorbent in the form of barium nitrate $(Ba(NO_3)_2)$ as a nitrate. That is, $$BaCO_3 + NO_2 \rightarrow Ba(NO_3)_2 + CO_2 \uparrow \qquad (1)$$

Figure 12B:
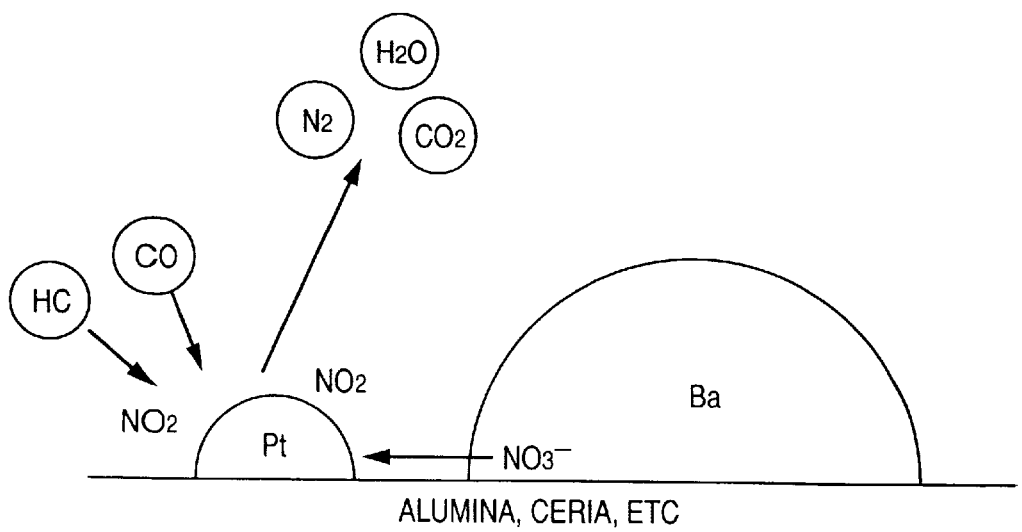
FIG. 12B is an explanatory view showing the mechanism of NOx release and deoxidization/purification.

On the other hand, when the oxygen concentration in exhaust gas decreases, reaction progresses in a direction opposite to the above reaction. As shown in FIG. 12B, barium nitrate $(Ba(NO_3)_2)$ is substituted by supplied CO to produce barium carbonate $(BaCO_3)$ and nitrogen dioxide. That is, $$Ba(NO_3)_2 + CO \rightarrow BaCO_3 + NO_2 \uparrow \qquad (2)$$

Then, $NO_2$ reacts with HC, CO, and the like on platinum (Pt) and is deoxidized and purified. That is, $$NO_2 + HC + CO \rightarrow N_2 + H_2O + CO_2 \uparrow \qquad (3)$$

Since NOx is released from the catalyst 25 and is deoxidized and purified, the catalyst 25 is ready to sufficiently adsorb NOx in exhaust gas again (refresh of the catalyst).

In such mechanisms of NOx adsorption and deoxidization/purification, if the concentration of deoxidizing agent components such as HC and CO is high when the oxygen concentration in exhaust gas decreases, NOx release from the catalyst 25 and its deoxidization/purification are promoted. On the other hand, since HC and CO in exhaust gas also react with NOx contained in exhaust gas, if the NOx emission is large upon fuel combustion, HC and CO are consumed by that reaction with NOx, and $NO_2$ on platinum (Pt) in the catalyst layer cannot be sufficiently deoxidized. That is, if the NOx concentration in exhaust gas is high, the reactions given by formulas (2) and (3) above do not sufficiently progress, thus disturbing refresh of the catalyst 25.

That is, in order to refresh the catalyst 25, it is very important to decrease the NOx concentration in addition to increase the HC and CO concentrations in exhaust gas. In other words, refresh of the catalyst 25 can be sufficiently promoted by increasing the concentration ratio CO/NOx of the CO concentration to the NOx concentration in exhaust gas.

Figure 13:
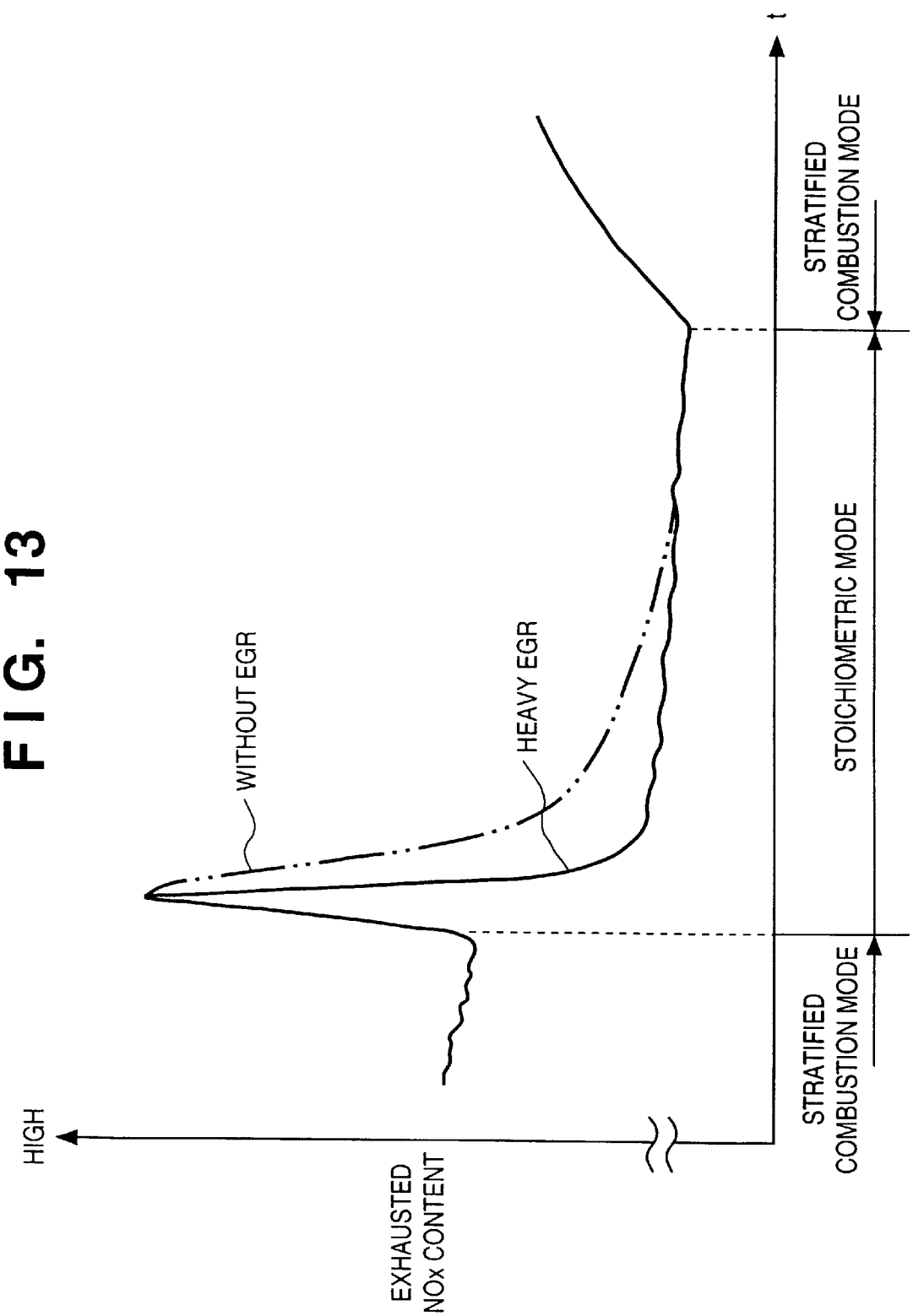
FIG. 13 is a graph which shows changes in exhausted NOx concentration on the downstream side of the catalyst and compares cases of heavy EGR and no EGR.

FIG. 13 shows changes in exhausted NOx concentration on the downstream side of the catalyst when the engine 1 runs in the stratified combustion mode for a while and its combustion mode is switched to the stoichiometric mode. As shown in FIG. 13, when the engine 1 is switched from the stratified combustion mode to the stoichiometric mode, NOx stored in the catalyst 25 is released, and the NOx concentration temporarily abruptly increases. After that, since the released NOx is deoxidized and decomposed by a three-way effect of the catalyst 25 while the oxygen concentration in exhaust gas is low, the NOx concentration gradually decreases. At this time, as the CO/NOx ratio in exhaust gas is low before exhaust gas is recirculated, the NOx concentration decreases slowly, as indicated by the imaginary curve in FIG. 13. On the other hand, since the CO/NOx ratio in exhaust gas is high in heavy EGR indicated by the solid curve in FIG. 13, deoxidization/decomposition of NOx is promoted, and the NOx concentration decreases quickly, as indicated by the solid curve in FIG. 13. As a result, NOx release from the catalyst 25 is promoted.

Hence, according to the control apparatus A for an engine of this embodiment, when the NOx adsorbing catalyst 25 inserted in the exhaust path 22 is refreshed by releasing adsorbed NOx therefrom, weakly stratified combustion is accomplished by dividing fuel injection, heavy EGR for recirculating a large amount of exhaust gas is set, and the CO/NOx concentration ratio in exhaust gas is greatly increased by their synergetic effect. Hence, NOx release from the catalyst 25 and deoxidization/purification can be sufficiently promoted.

In addition, in this embodiment, since the air-fuel ratio of the combustion chamber 4 is periodically changed to the rich and lean sides by dither control of the fuel injection quantity so as to vary the concentrations of CO, HC, $O_2$, and the like in exhaust gas, their influences on the catalyst 25 can be enhanced, and refresh of the catalyst can be further promoted.

Since refresh of the catalyst 25 can be sufficiently promoted, the air-fuel ratio of the combustion chamber 4 of the engine 1 can be controlled to be leaner than the conventional apparatus, thus minimizing an increase in fuel consumption while suppressing extra fuel from being consumed.

[Other Embodiments]

Note that the present invention is not limited to the above embodiment, and includes various other embodiments. That is, in the above embodiment, when the accumulated value Tlean of the lean combustion time of the engine 1 has exceeded the first set value T1, it is determined that the NOx release period has been reached. However, the present invention is not limited to this. For example, the adsorbed NOx amount of the catalyst 25 may be estimated on the basis of the distance the vehicle traveled after the previous NOx release period, and the total quantity of fuel consumed during that interval, and the NOx release period may be determined on the basis of the estimation result.

In the above embodiment, upon releasing NOx from the catalyst 25, the air-fuel ratio of the combustion chamber 4 of the engine 1 is periodically varied by dither control (feedforward control). However, the present invention is not limited to such specific control. For example, the air-fuel ratio may be feedback-controlled to periodically change to the rich and lean sides on the basis of the signal from the $O_2$ sensor.

In the above embodiment, the engine 1 runs in the stratified combustion mode in the low-load range. However, the engine 1 may be a lean-burn engine that does not combust fuel in the stratified combustion mode. That is, the air-fuel ratio of the combustion chamber 4 in the low-load range need only be set to satisfy excessive air ratio $\lambda \geq 1.3$.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus for a spark ignition type direct injection engine, which comprises:
    a fuel injection valve for directly injecting and supplying fuel into a combustion chamber in each cylinder of an engine; and
    a NOx adsorbing catalyst which is inserted in an exhaust path communicating with the combustion chamber, adsorbs NOx in an excess oxygen atmosphere with high oxygen concentration in exhaust gas, and releases the adsorbed NOx when the oxygen concentration decreases, and
    which controls an air-fuel ratio of the combustion chamber to stay lean with excessive air ratio $\lambda \geq 1.3$ when the engine falls to a low-load range after the NOx adsorbing catalyst has been warmed up, comprising:
        exhaust gas recirculation means for recirculating some portion of exhaust gas from the exhaust path to an intake system of the engine;
        determination means for determining if a NOx release timing from the NOx adsorbing catalyst is reached;
        air-fuel ratio control means for controlling the air-fuel ratio of the combustion chamber to fall within a range $1 < \lambda \leq 1.1$ when said determination means determines that the NOx release period has been reached;
        injection timing control means for controlling the fuel injection valve to divisionally inject fuel in two injections including leasing injection which falls within a range from an intake stroke to a former period of a compression stroke of the cylinder, and trailing injection which is set after a middle period of the compression stroke and before an ignition period, when said determination means determines that the NOx release period has been reached; and
        exhaust gas recirculation control means for controlling said exhaust gas recirculation means to recirculate a predetermined amount of exhaust gas, when said determination means determines that the NOx release period has been reached,
        wherein said exhaust gas recirculation control means controls said exhaust gas recirculation means to recirculate exhaust gas to the intake system to achieve a recirculation ratio of not less than 30%, and the recirculation ratio of exhaust gas is given by:

(carbon dioxide concentration in intake path–carbon dioxide concentration in air)/(carbon dioxide concentration in exhaust path–carbon dioxide concentration in intake path).

2. The apparatus according to claim 1, wherein said determination means determines that the NOx release timing has been reached, on the basis of a time for which the air-fuel ratio of the combustion chamber of the engine stays lean.

3. The apparatus according to claim 1, wherein a fuel injection quantity of the trailing injection falls within a range from around 20% to around 80% of a total injection quantity of leading and trailing injection quantities.

4. The apparatus according to claim 3, wherein said injection timing control means controls the fuel injection valve to non-divisionally inject fuel after the middle period of the compression stroke so as to accomplish stratified combustion when the engine falls within the low-load range and the NOx release timing is not reached.

5. The apparatus according to claim 4, wherein said injection timing control means controls to inject fuel in the intake stroke in addition to fuel injection done after the middle period of the compression stroke of the cylinder, when said determination means determines that the NOx release period has been reached.

6. The apparatus according to claim 4, wherein said exhaust gas recirculation control means controls said exhaust gas recirculation means to recirculate exhaust gas when the engine runs in the stratified combustion state, and controls to proceed with recirculation of exhaust gas when said determination means determines in this state that the NOx release timing has been reached.

7. The apparatus according to claim 1, wherein said air-fuel ratio control means periodically changes the air-fuel ratio of the combustion chamber to rich and lean sides with respect to a reference value, and the reference value of the air-fuel ratio is set to fall within a range of A/F=15 to 16.

8. A control apparatus for a spark ignition type direct injection engine, which comprises:

a fuel injection valve for directly injecting and supplying fuel into a combustion chamber in each cylinder of an engine;

a NOx adsorbing catalyst which is inserted in an exhaust path communicating with the combustion chamber, adsorbs NOx in an excess oxygen atmosphere with high oxygen concentration in exhaust gas, and releases the adsorbed NOx when the oxygen concentration decreases; and an engine controller for controlling an air-fuel ratio of the combustion chamber to stay lean with excessive air ratio $\lambda \geq 1.3$ when the engine falls in a low-load range after the NOx adsorbing catalyst has been warmed up, comprising:

an exhaust gas recirculation device for recirculating some portion of exhaust gas from the exhaust path to an intake system of the engine, wherein said engine controller determines if a NOx release timing from the NOx adsorbing catalyst is reached, controls the air-fuel ratio of the combustion chamber to fall within a range $1<\lambda \leq 1.1$ when it is determined that the NOx release period has been reached, controls the fuel injection valve to divisionally inject fuel in two injections including leading injection which falls within a range from an intake stroke to a former period of a compression stroke of the cylinder, and trailing injection which is set after a middle period of the compression stroke and before an ignition period, when it is determined that the NOx release period has been reached, controls said exhaust gas recirculation device to recirculate a predetermined amount of exhaust gas, when it is determined that the NOx release period has been reached, and controls said exhaust gas recirculation device to recirculation exhaust gas to the intake system to achieve a recirculation ratio of not less than 30%, and the recirculation ratio of exhaust gas is given by:

(carbon divide concentration in intake path–carbon dioxide concentration in air)/(carbon dioxide concentration in exhaust path–carbon dioxide concentration in intake path).

9. The apparatus according to claim 8, wherein said engine controller determines that the NOx release timing has been reached, on the basis of a time for which the air-fuel ratio of the combustion chamber of the engine stays lean.

10. The apparatus according to claim 8, wherein a fuel injection quantity of the trailing injection falls within a range from around 20% to around 80% of a total injection quantity of leading and trailing injection quantities.

11. The apparatus according to claim 10, wherein said engine controller controls the fuel injection valve to non-divisionally inject fuel after the middle period of the compression stroke so as to accomplish stratified combustion when the engine falls within the low-load range and the NOx release timing is not reached.

12. The apparatus according to claim 11, wherein said engine controller controls to inject fuel in the intake stroke in addition to fuel injection done after the middle period of the compression stroke of the cylinder, when it is determined that the NOx release period has been reached.

13. The apparatus according to claim 11, wherein said engine controller controls said exhaust gas recirculation device to recirculate exhaust gas when the engine runs in the stratified combustion state, and controls to proceed with recirculation of exhaust gas when it is determined in this state that the NOx release timing has been reached.

14. The apparatus according to claim 8, wherein said engine controller periodically changes the air-fuel ratio of the combustion chamber to rich and lean sides with respect to a reference value, and the reference value of the air-fuel ratio is set to fall within a range of A/F=15 to 16.

* * * * *